CROWN AND DISK ASSEMBLY AND TESTING MACHINE

Filed Nov. 9, 1945 10 Sheets-Sheet 1

INVENTOR,
ROBERT P. SMITH,
By Herbert A. Minturn,
ATTORNEY.

CROWN AND DISK ASSEMBLY AND TESTING MACHINE

Filed Nov. 9, 1945 10 Sheets-Sheet 2

INVENTOR,
ROBERT P. SMITH,
BY Herbert A. Minturn,
ATTORNEY.

Jan. 23, 1951 R. P. SMITH 2,538,887

CROWN AND DISK ASSEMBLY AND TESTING MACHINE

Filed Nov. 9, 1945 10 Sheets-Sheet 3

INVENTOR,
ROBERT P. SMITH,
By Herbert A. Minturn,
ATTORNEY.

INVENTOR,
ROBERT P. SMITH,
By Herbert A. Minturn.
ATTORNEY.

CROWN AND DISK ASSEMBLY AND TESTING MACHINE

INVENTOR,
ROBERT P. SMITH,
By Herbert A. Minturn,
ATTORNEY.

CROWN AND DISK ASSEMBLY AND TESTING MACHINE

Filed Nov. 9, 1945 10 Sheets-Sheet 6

INVENTOR,
ROBERT P. SMITH,
BY Herbert A. Minturn,
ATTORNEY.

CRONW AND DISK ASSEMBLY AND TESTING MACHINE

Filed Nov. 9, 1945 10 Sheets-Sheet 7

INVENTOR,
ROBERT P. SMITH,
By Herbert A. Minturn,
ATTORNEY.

CROWN AND DISK ASSEMBLY AND TESTING MACHINE

Filed Nov. 9, 1945 10 Sheets-Sheet 8

INVENTOR,
ROBERT P. SMITH,
By Herbert A. Minturn
ATTORNEY.

Jan. 23, 1951 R. P. SMITH 2,538,887

CROWN AND DISK ASSEMBLY AND TESTING MACHINE

Filed Nov. 9, 1945 10 Sheets-Sheet 9

INVENTOR,
ROBERT P. SMITH,
By Herbert A. Minturn,
ATTORNEY.

CROWN AND DISK ASSEMBLY AND TESTING MACHINE

INVENTOR,
ROBERT P. SMITH,
By Herbert A. Minturn,
ATTORNEY.

Patented Jan. 23, 1951 2,538,887

UNITED STATES PATENT OFFICE 2,538,887

CROWN AND DISK ASSEMBLY AND TESTING MACHINE

Robert P. Smith, Crawfordsville, Ind.

Application November 9, 1945, Serial No. 627,663

11 Claims. (Cl. 73—43)

This invention relates to a machine for applying sealing disks to the insides of crowns and checking and testing the crown assembly for defects and discarding defective assemblies in order that only usable assemblies are grouped and collected together.

A primary object of the invention is to provide a machine to remove as much as possible the human element from inspection duties, whereby every crown assembly passed by the machine as being usable can be depended upon as being such without further checking.

A still further primary object of the invention is to provide automatic checking throughout the machine, whereby the sealing disks will not be wasted or fed in the absence of crowns so that jamming up of the machine is prevented, as well as the elimination of wastage of the disks, and likewise when, for some reason, no disks are being fed, the crowns will be removed from the machine until that situation is remedied. As above indicated, it is the intention that the entire machine be selfcontrolled once it is set in operation and will indicate promptly any difficulty as to feeding of the crowns, the sealing disks and the testing operation. A great advantage of the invention will be found in the unique assembly of the various elements permitting the machine to be constructed in a compact form to occupy very much less floor space than that of any other assembling machine heretofore known, a fact which permits a greater production per unit of time with a minimum floor space.

Figures 1, 2, 3:
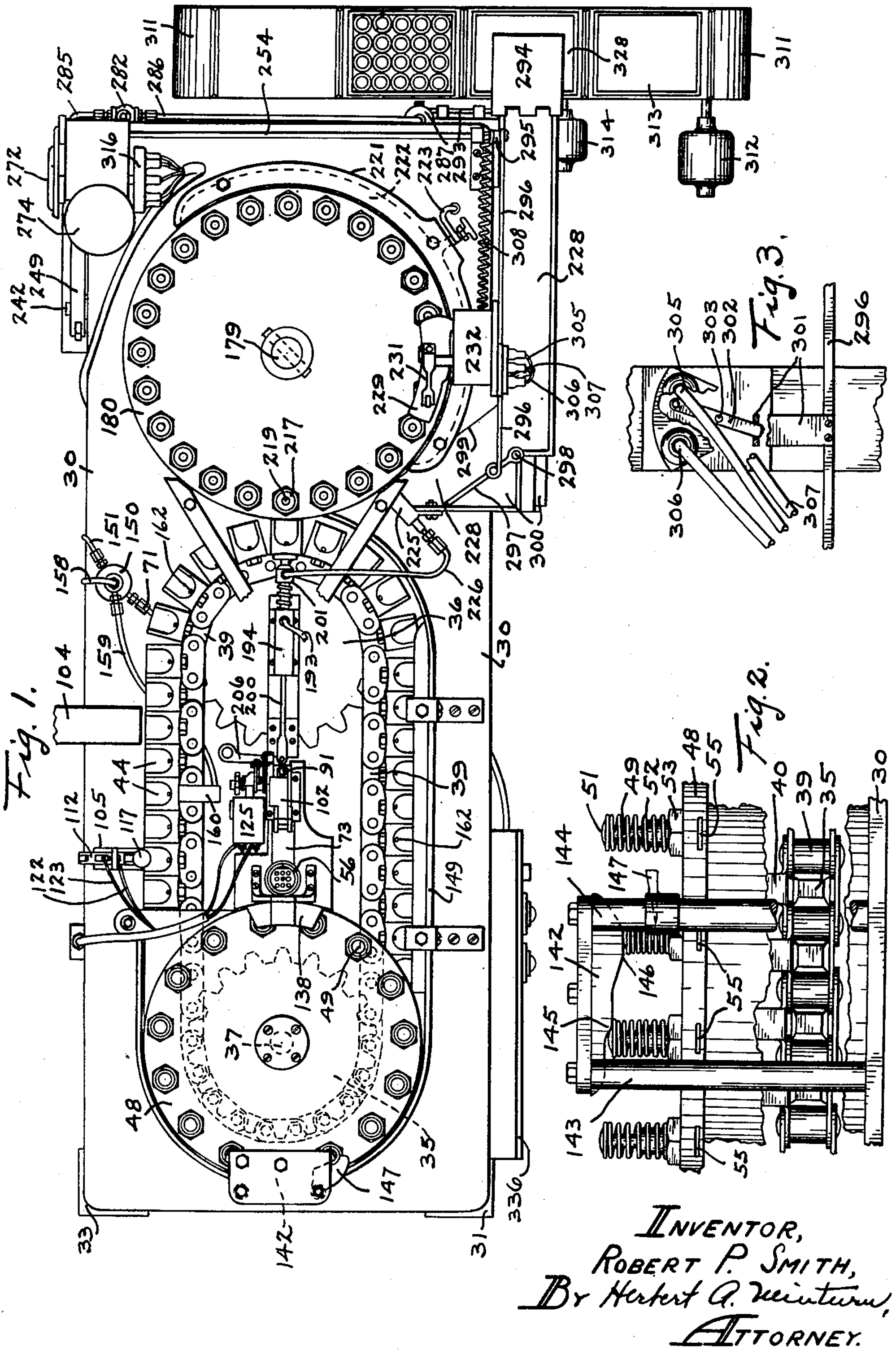
Figures 4, 5:
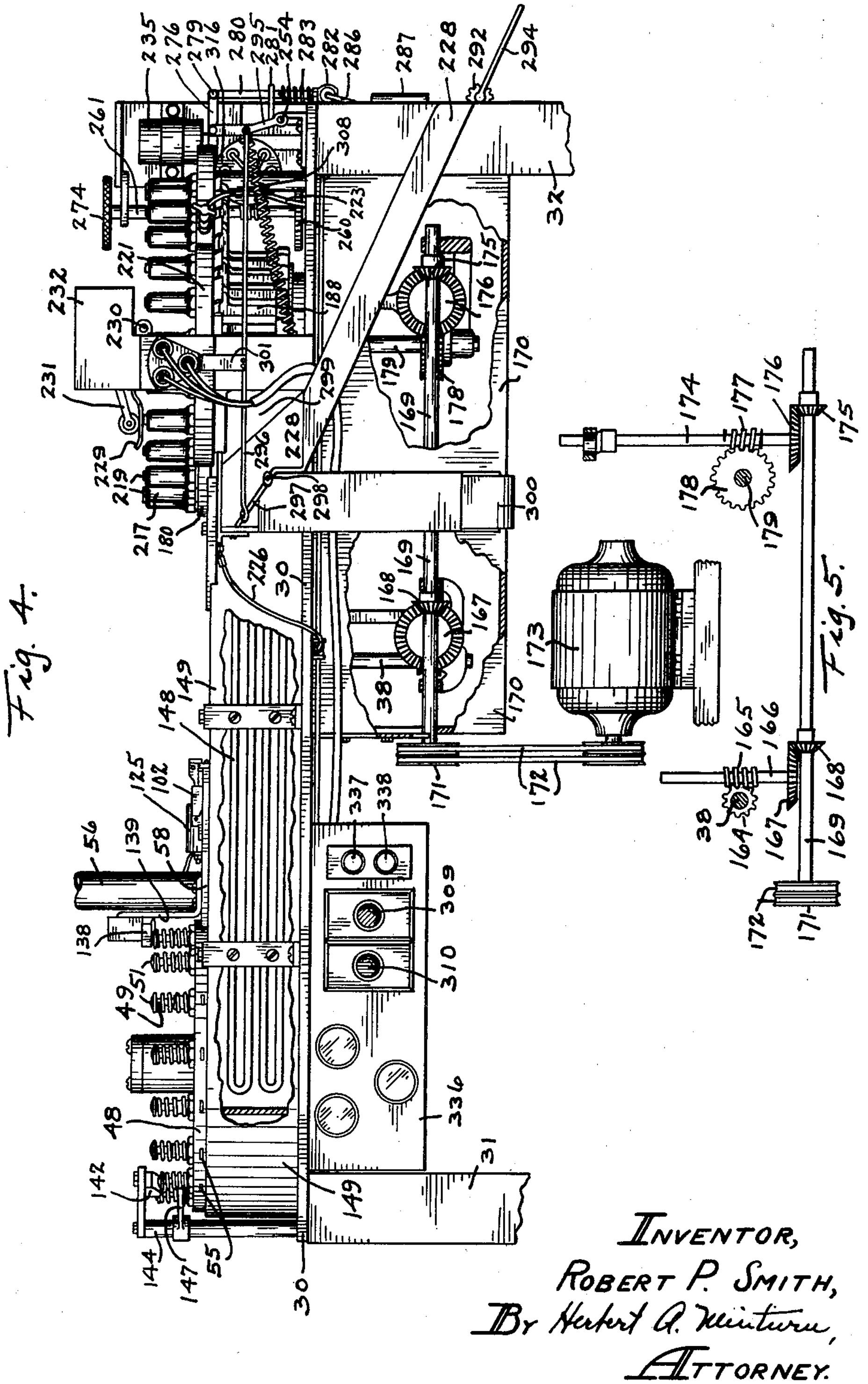
Figure 6:
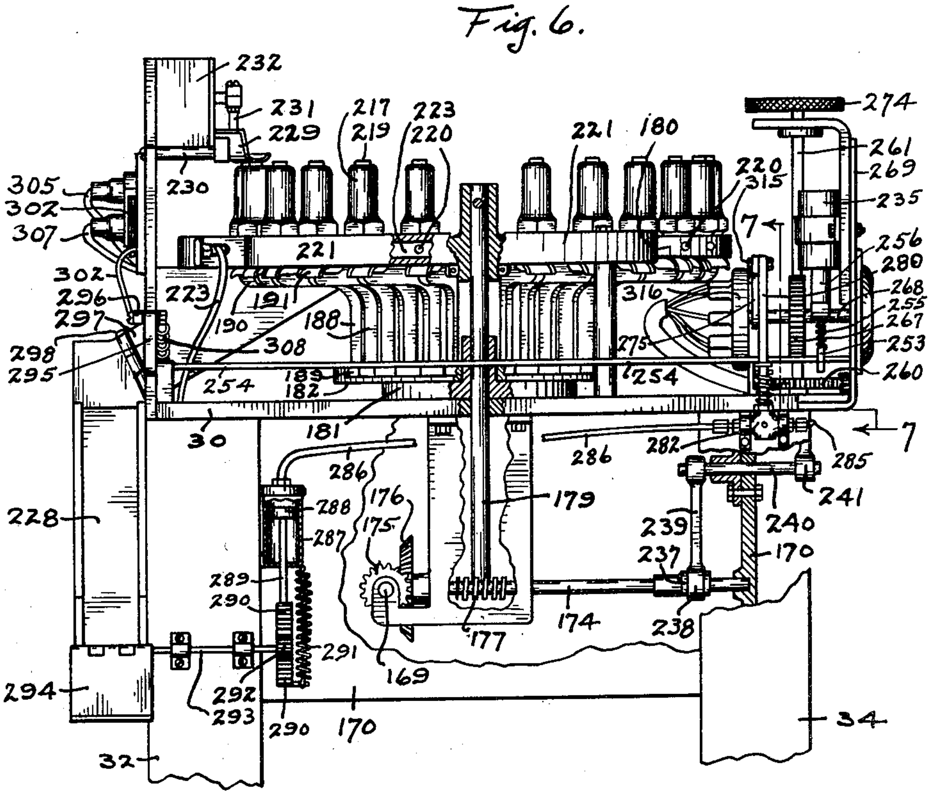
Figure 7:
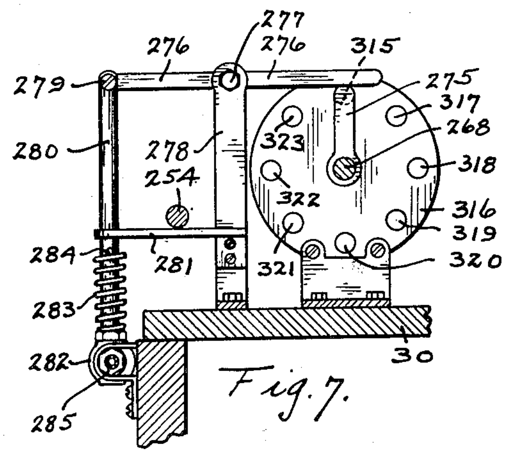
Figure 8:
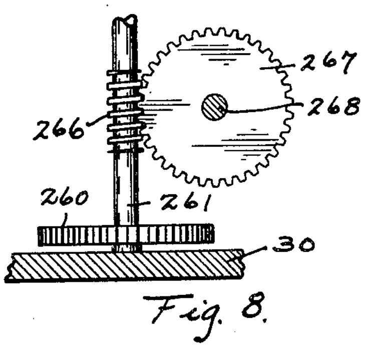
Figures 9, 11, 12:
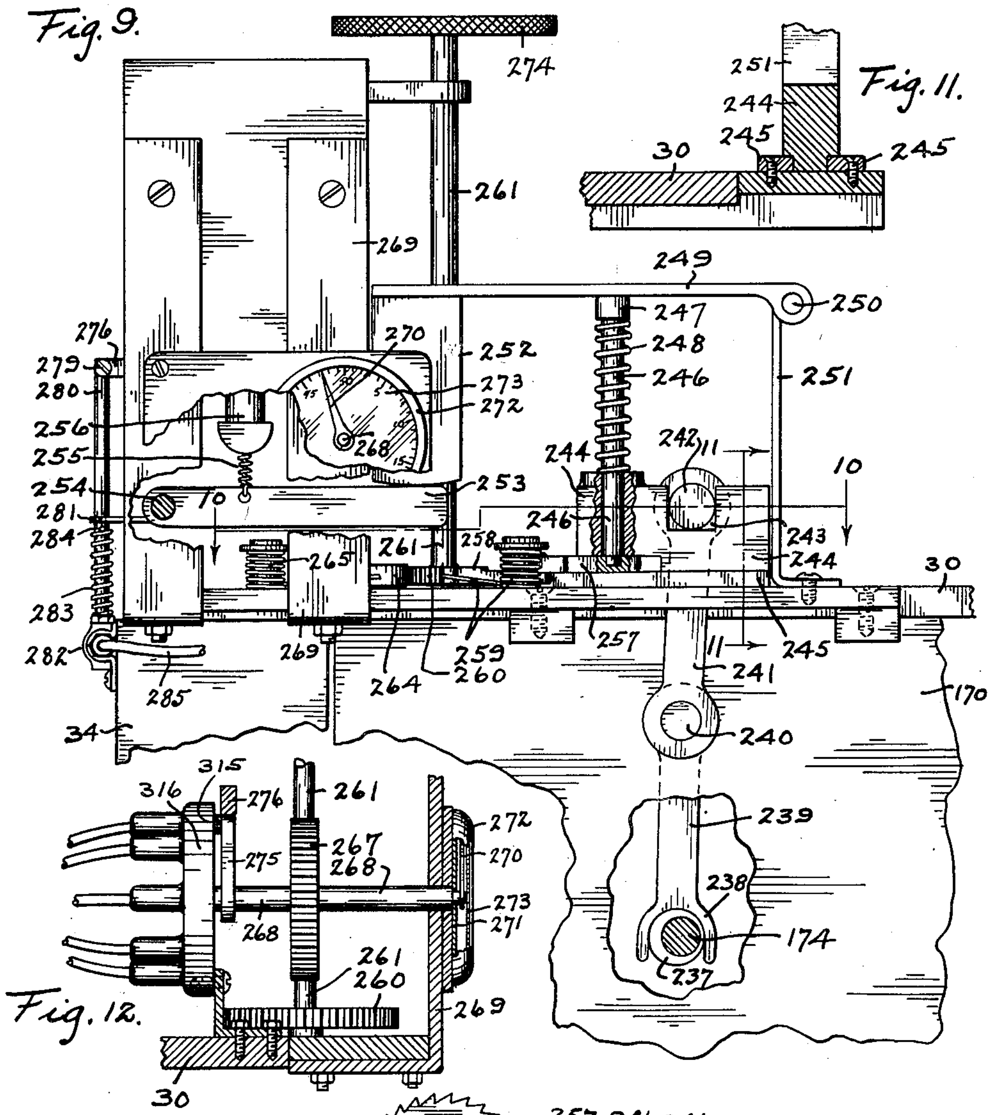
Figure 10:
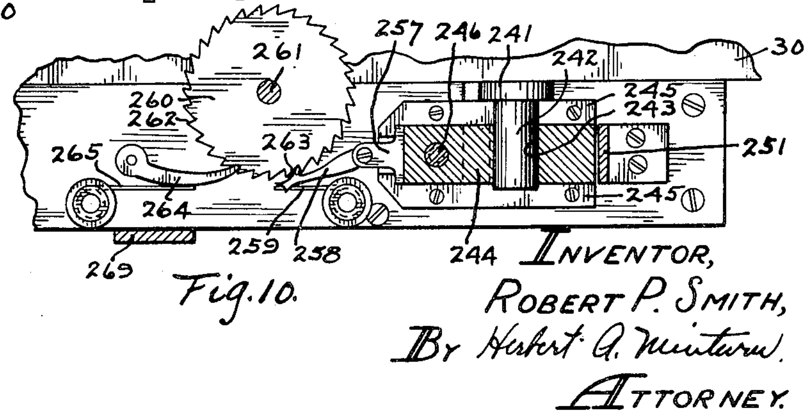
Figure 15:
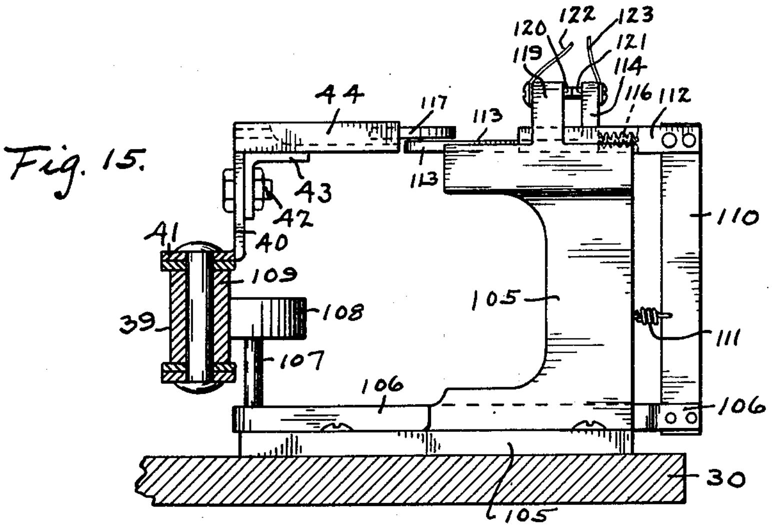
Figures 13, 14, 16:
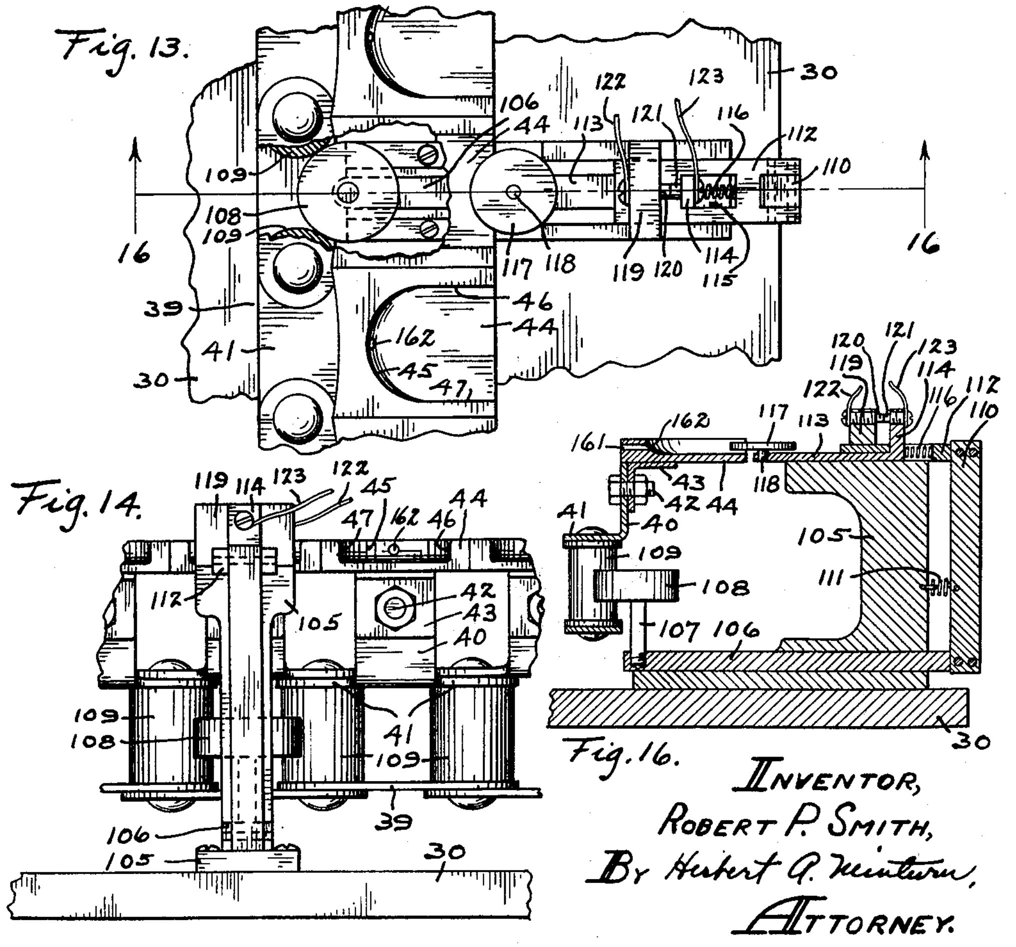
Figure 17:
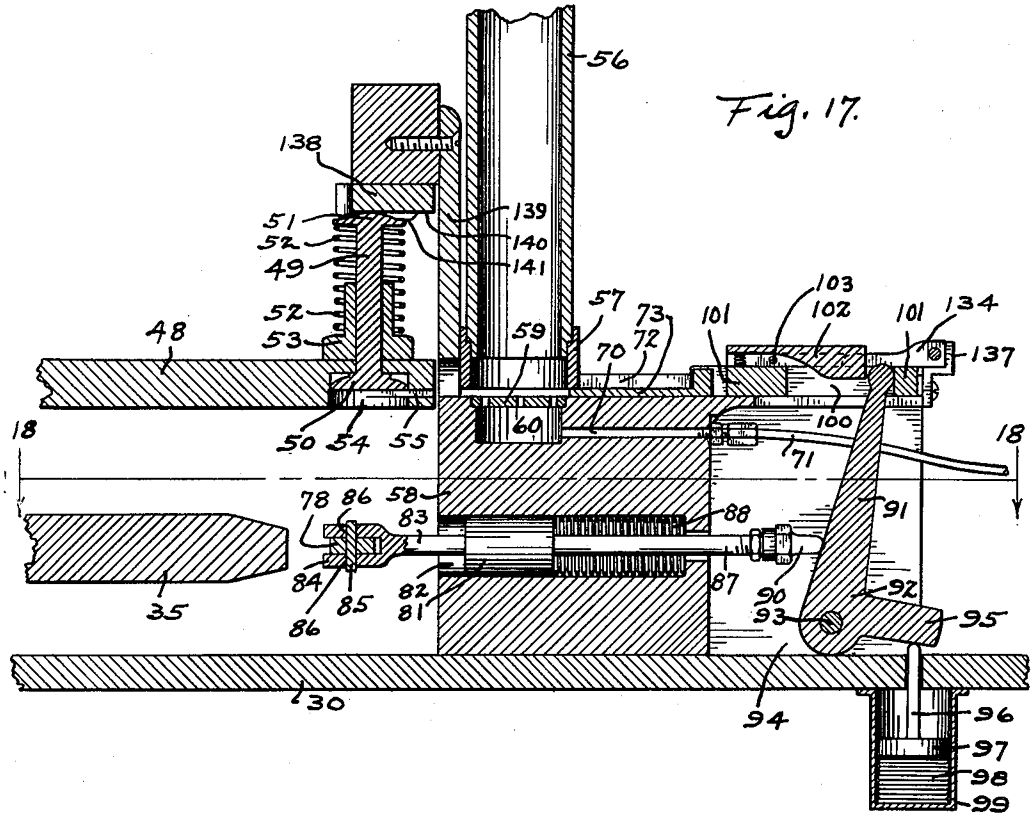
Figure 18:
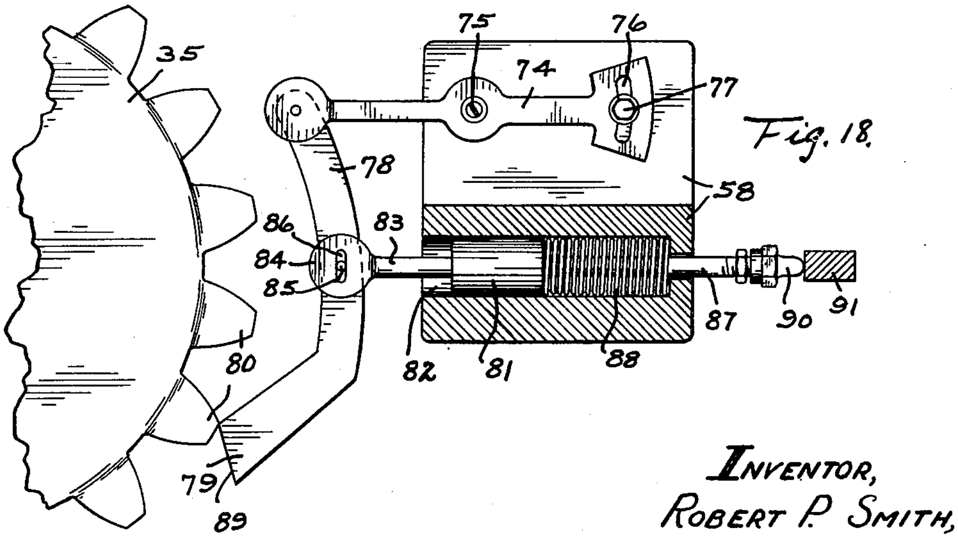
Figures 19, 21:
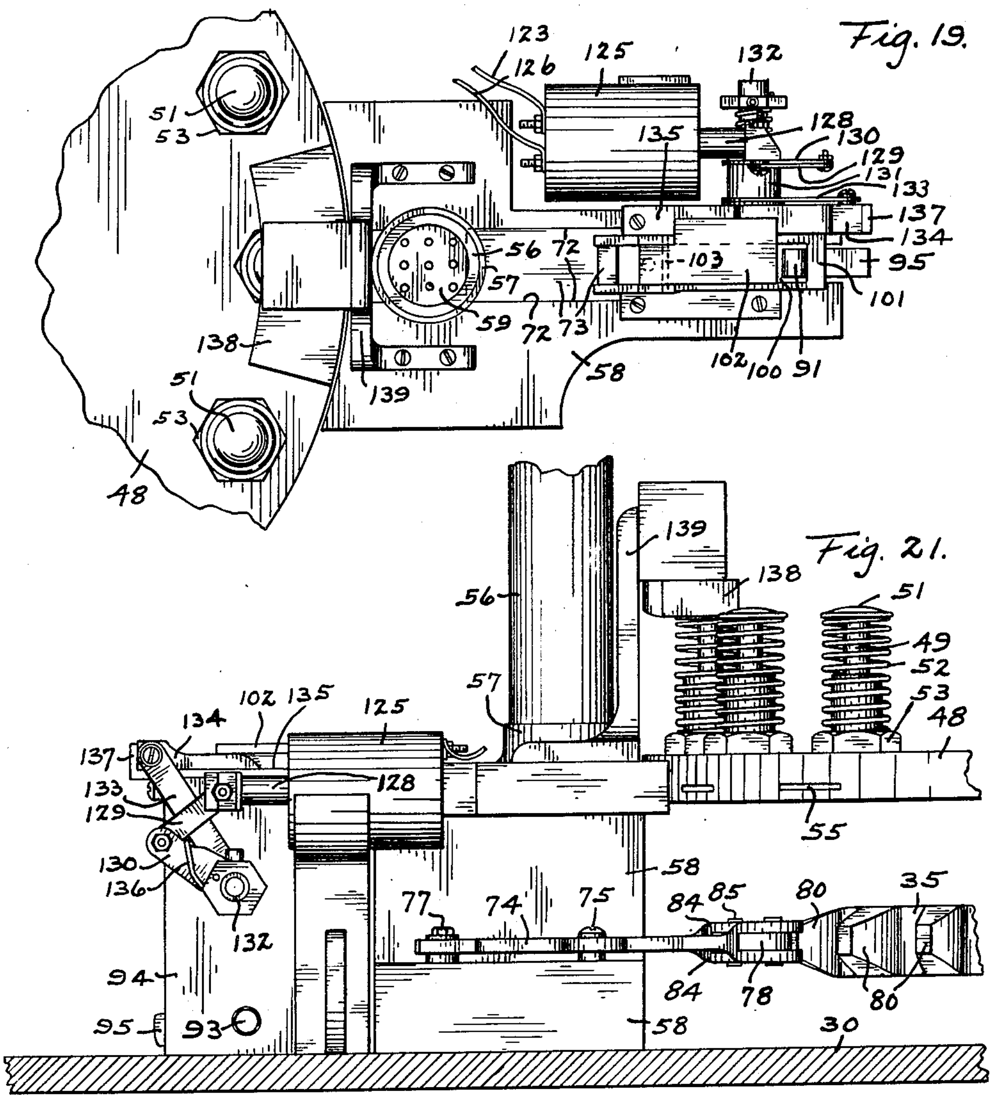
Figure 20:
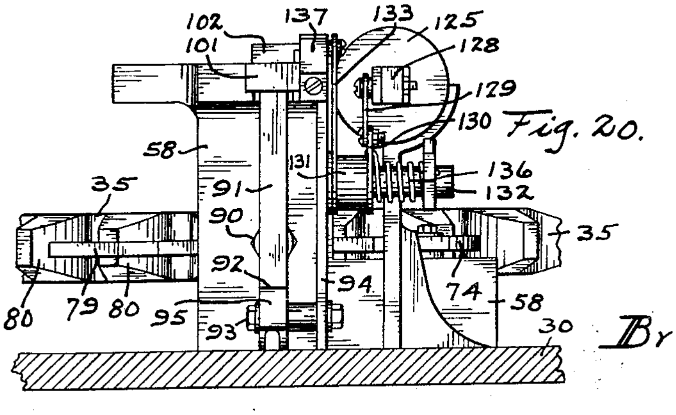
Figures 22, 23:
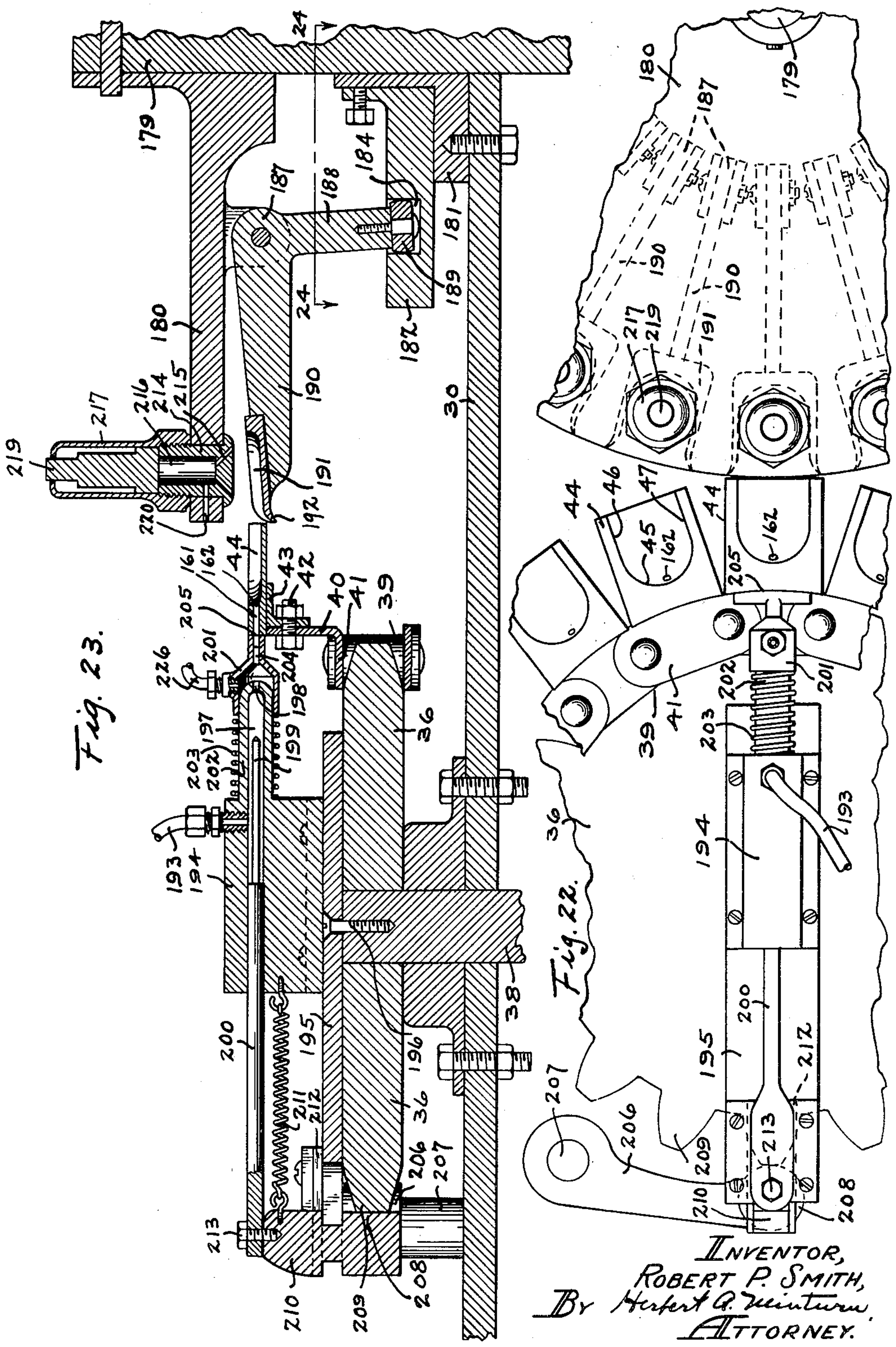
Figures 24, 25, 26, 27, 28:
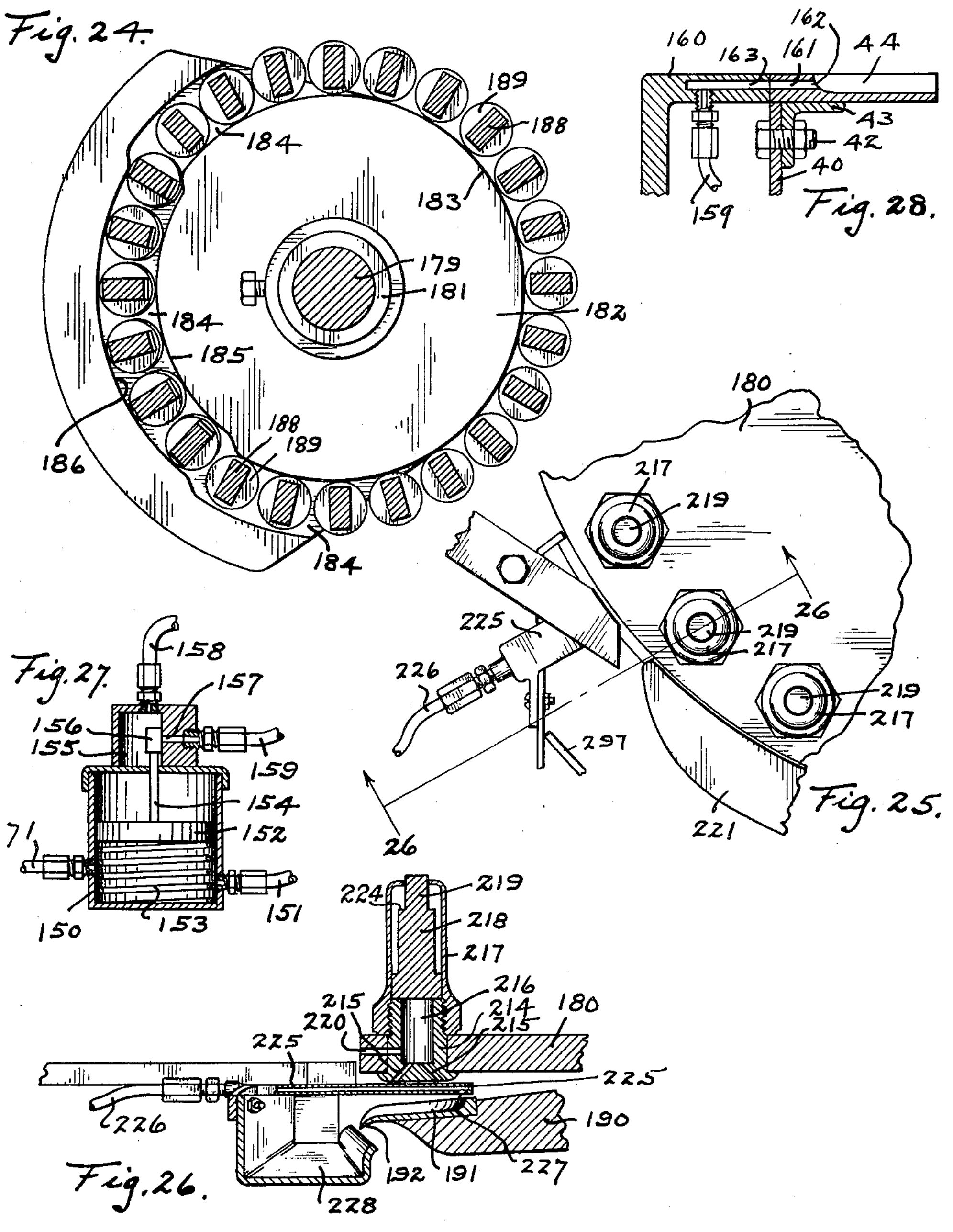
Figure 29:
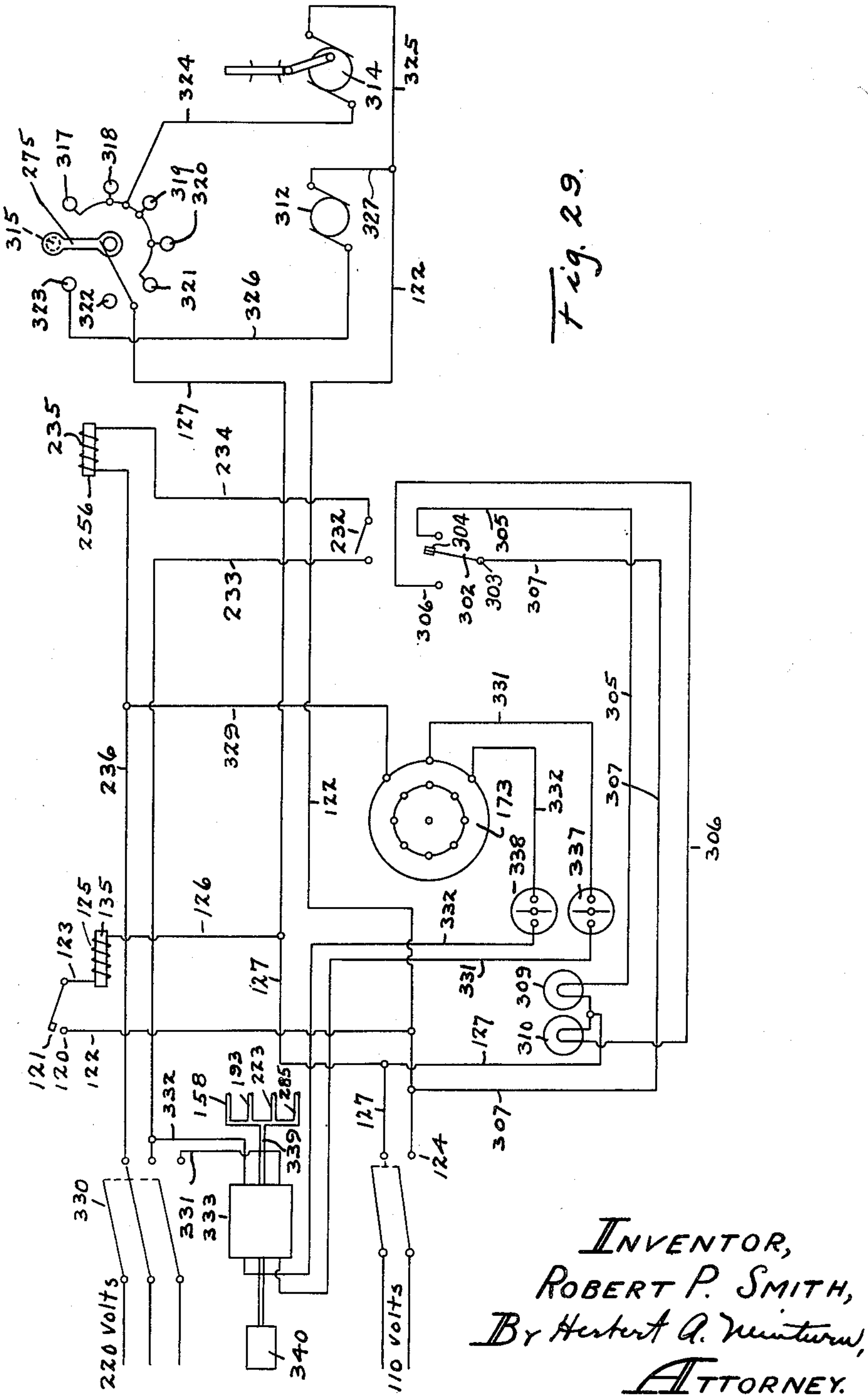

These and many other objects and advantages of the invention will become apparent to those versed in the art in the following description of one particular form of the invention as illustrated in the accompanying drawings, in which Fig. 1 is a view in top plan of a structure embodying the invention;

Fig. 2, a fragmentary left hand end elevation of an upper portion of the machine;

Fig. 3, a detail in partial section and front elevation of a signal and control switch;

Fig. 4, a view in front elevation with portions of walls cut away;

Fig. 5, a detail in horizontal plan view of the driving system;

Fig. 6, a view in right hand end elevation and partial section of the machine;

Fig. 7, a detail on an enlarged scale in vertical section on the line 7—7;

Fig. 8, a detail in vertical section also on an enlarged scale of the counter indicator drive;

Fig. 9, a view in elevation and partial section of a fragmentary portion of the rear side of the machine toward the right hand end thereof;

Fig. 10, a view in horizontal section on the line 10—10 in Fig. 9;

Fig. 11, a detail in vertical section on the line 11—11 in Fig. 9;

Fig. 12, a detail in partial section and vertical elevation through the counter and drive mechanism;

Fig. 13, a detail in top plan view and partial section of the "no crown" mechanism for withholding sealing disk feed;

Fig. 14, a view in rear elevation of that detail;

Fig. 15, a view in right hand side elevation of that mechanism;

Fig. 16, a view in vertical section on the line 16—16 in Fig. 13;

Fig. 17, a detail in vertical section through the sealing disk feed mechanism;

Fig. 18, a view in horizontal section on the line 18—18 in Fig. 17;

Fig. 19, a detail in top plan view of the sealing disk feed mechanism;

Fig. 20, a view in vertical elevation of the right hand end of that feed mechanism;

Fig. 21, a view in rear elevation of that feed mechanism;

Fig. 22, a fragmentary view in top plan of the mechanism for shifting crown assemblies to the testing head;

Fig. 23, a view in central vertical section through that transfer mechanism;

Fig. 24, a horizontal transverse section in the plane of the line 24—24 in Fig. 23;

Fig. 25, a detail in top plan view of the testing head discharge;

Fig. 26, a detail in vertical section on the line 26—26 in Fig. 25;

Fig. 27, a transverse vertical section through the pressure valve for kicking out crowns;

Fig. 28, a central transverse vertical section through a crown cup and the pressure nozzle for kicking out crowns; and Fig. 29, a wiring diagram of the control and indicating circuits.

Like characters of reference indicate like parts throughout the several views in the drawings.

A suitable base 30 of any type, herein shown as in the nature of a plate mounted on legs 31 and 32 on the front side and 33 and 34 on the rear side to form a table-like structure. On the upper side of the plate 30 are mounted a pair of spaced apart sprocket wheels 35 and 36 each to be revoluble about spaced apart axes, the sprocket wheel 35 being mounted on the vertical shaft 37 and the sprocket wheel 36 being mounted on the vertical shaft 38. A roller chain 39 surrounds these two sprocket wheels to engage the sprockets thereof in such manner that when the wheel 36 is driven by the shaft 38, the chain 39 will drive the wheel 35. The under side of this roller chain 39 is made in the usual standard manner, but the upper side has upturned legs 40 extending integrally from the outer edges of the plates 41 as best indicated in Figs. 2, 14, 15 and 23. Referring to Fig. 23, where the structure is clearly shown, the leg 40 is bent upwardly at right angles to the plane of the plate 41 and has bolted thereto by means of the bolt 42 an angle 43 on the top side of which is secured thereto a crown carrying cup 44.

Each cup 44 is hollowed out from the top side to have the inner portion thereof curved to conform to the curvature of a crown (not shown) when that crown is positioned in the cup in an inverted position. From this inner curved portion of the cup, side walls of the cavity extend outwardly in parallel relation one to the other tangentially of the curved portion, whereby a crown when positioned back in the cup against the inner curved end, designated by the numeral 45, may be slid outwardly from the cup 44 over the floor thereof between the parallel sides 46 and 47, Fig. 22. The depth of the cavity forming the cup is equal substantially to the overall height of the crown to be handled. The outer vertical edges of the cups 44 are in vertical planes preferably and are parallel one to the other and so spaced apart that in a straight position of the chain, these vertical edges will be in close proximity and, in fact, may contact opposing faces. The top faces of the cup members 44 are spaced in a common plane well above the plane of the top faces of the wheels 35 and 36.

A circular plate 48 is spaced above the sprocket wheel 35 centered on the shaft 37 to be revolved with the wheel 35. Spaced around the peripheral portion of this plate 48 are a plurality of spaced apart vertically reciprocating pungers 49, these plungers being located at a common radial distance from the axis of the plate 48 there being one plunger 49 located to be above and centered thereover each cup 44 on the left hand side of the sprocket wheel 35. Referring to Fig. 17, the lower end of the plunger 49 carries a foot 50 which may reciprocate within a cylindrical bore 54 entering from the under side of the plate 48. The upper end of the plunger 49 carries a head 51, against the under side of which bears a spring 52 to extend therearound and bear by its lower end against the plunger guide 53, whereby the spring 52 tends to maintain the plunger 49 and its foot 50 in the extreme upper position as indicated in Fig. 17, whereby the upper portion of the foot 50 abuts the upper end of the cylindrical bore 54 provided in the plate 48. A transverse passageway 55 enters from the vertical edge of the plate 48 to open into the cylindrical bore 54 in each instance at an elevation therealong to be open by its inner end when the foot 50 is in its uppermost position. The width of this passageway 55 is equal to or slightly in excess of the diameter of the bore 54. The diameter of this bore 54 is a few thousandths of an inch less in diameter than that of the sealing disk (not shown) to be employed.

On the table 30, centered on the longitudinal center line thereof in the present showing, is mounted in any suitable manner a cylindrical tube 56 to have its axis extend vertically in respect to the surface of the table top 30 and to be in close proximity to the periphery of the plate 48. In the present showing, the tube 56 is fixed by its lower end within a ferrule 57 which is secured to the top side of a block 58 in turn secured to the top 30. Across the lower end and spaced therefrom of the ferrule 57 is a perforated seat 59 horizontally disposed. This seat 59 is across the upper end of a vertical bore 60 provided in the upper portion of the block 58. From the bore 60 leads a passageway 70 to be interconnected with a pipe line 71 leading therefrom.

Across the top side of the block 58, Figs. 17 and 19, is a longitudinally disposed slot 72 within which is slidingly carried a slide bar 73. The vertical thickness of this bar 73 is equivalent to or slightly less than the vertical thickness of the sealing disk to be employed. The ferrule 57 is so mounted on the block 58, Fig. 17, as to permit the bar 73 to be reciprocated entirely thereacross to have its left hand end enter the passageway 55 of the plate 48 upon proper registry of the passageway therewith. The tube 56 serves as a reservoir for a pile of the sealing disks, one superimposed over the other to have the entire pile rest upon the seat 59. Reciprocation of the bar 73 will cause the undermost disk to be pushed out from under the pile transversely across through the passageway 55 and into the bore 54 to center directly under the plunger foot 50 and thereafter the bar 73 will be retracted to the position indicated in Figs. 17 and 19.

To provide for reciprocation of the bar 73, the mechanism primarily illustrated in Figs. 17 and 18 is employed. On the rear side of the block 58 is mounted a lever 74 to pivot about a vertical axis as determined by the screw 75 passing through a central portion of the lever 74 and engaging with an extension of the block 58 thereunder. This lever 74 is provided with a slot 76 through a right hand portion thereof, to receive a cap screw 77 therethrough to engage in the block 58 thereunder. The outer and left hand end of the lever 74 is adjusted to a transverse position within the limits of the length of the slot 76 and fixed in any selected position by means of the screw 77.

Pivoted to the left hand end of the lever 74 is a rocker arm 78. This rocker arm 78 is carried around from the end of the lever 74 under the plate 48 to have an end portion 79 in the path of the sprockets 80 of the wheel 35. A piston 81 is slideably carried within a horizontally disposed bore 82 in the block 58 and a rod 83 extends from the piston 81 to be pivotly interconnected with an intermediate portion of the rocker arm 78, herein shown as by a bifurcated end 84 straddling the lever 78 from the top and bottom sides and having a pin 85 fixed to the arm 78 and extending vertically upwardly and downwardly therefrom through slots 86 provided in the top and bottom segments of the end 84. From the right hand end of the piston 81 extends a rod 87 to extend beyond the block 58. Surrounding this rod 87 is a compression spring 88 bearing between an abutment in the bore 82 and the right hand end of the piston 81 normally, yieldingly pushing the end portion 79 into the path of the sprockets 80. The face 89 of the lever end portion 79 is formed at an angle which will permit the sprockets 80 to reciprocate the lever 78 in opposition to the spring 88 as one sprocket 80 after another comes thereagainst and slides therepast. The angularity of this face 89 is adjustably changed by swinging the lever 74 as above described.

The right hand end of the rod 87 carries a head 90 adjustably extensible and retractable along the end of the rod 87 to be in the path of the upper arm 91 of the bell crank lever 92 which is rockable about a horizontally disposed pin 93 carried by an upwardly extending plate 94. A short arm 95 extends substantially at right angles to the right of the upturned arm 91 to be in the path of a vertically extending rod 96 slidingly extending upwardly through the table 30 from a piston 97 bearing against a compression spring 98 within the spring well 99 fixed to the under side of the table 30. By means of this arrangement, the lever 91 is yieldingly urged by the spring 98 against the end of the head 90.

The upper end of the arm 91 extends within a slot 100 provided in the enlarged end 101 forming a part of the slide bar 73 to the right of the ferrule 57, Figs. 17, 19 and 20. A dog 102 is hinged on a transverse pin 103 to have a right hand end portion drop within the slot 100, Fig. 17, to be immediately on the left hand side of the upper end of the lever 91 when that end of the lever has its right side bearing against the right hand end of the slot 100, this being the normal inoperative position of the various parts, that is, the position secured when the lever 78 is in the rocked position shown in Fig. 18, and that position when the slide bar 73 is retracted from the sealing disk seat 59. When the position of any one of the sprockets 80 permits the end portion 79 of the lever 78 to drop therebetween, the spring 98 will push the rod 96 upwardly to in turn rock the bell crank arm 91 to the left since the head 90 is then withdrawn to the left permitting the weaker spring 98 to work. The spring 98 in that action supplies the motive force to cause the lever 91 through contact with the dog 102 to shift the entire slide bar 73 to the extreme left to carry the sealing disk into the bore 54 as above indicated. Further travel of the sprocket 80 will cause the lever 91 to return the slide bar 73 to the positions indicated in the drawings to overcome the spring 98.

Referring to Fig. 1, a chute 104 is indicated as being positioned on the rear side of the table to have an end directed toward the path of the cups 44. This chute is employed as a means for conveying from any suitable feeding mechanism (not shown and not forming a part of the present invention) crowns to be deposited one at a time in each cup 44 as the cup travels therepast. The crown is fed to have its concave side upward. The direction of the travel of the chain is counter-clockwise as viewed in Fig. 1 around the sprocket wheels 35 and 36 so that from the position of the chute 104, the cups 44 travel from right to left and past a checking mechanism which will now be explained.

This checking mechanism is primarily shown in Figs. 13–16 inclusive. On the table top 30 is mounted a bracket 105, and this bracket carries a slide bar 106 to be guided in a transverse direction in respect to the table top 30 and the flight of the chain 39 across the rear sides of the sprocket wheels 35 and 36. A vertically disposed pin 107 at the forward end of the slide 106 carries a roller 108 to be in the path of the rollers 109 of the chain 39. The diameter of this roller 108 is made to be such that the roller will drop between adjacent chain rollers 109 to a position substantially that as indicated in Fig. 13 where the forward side of the roller will be practically on a center line longitudinally of the chain 39.

The rear end of the slide 106 extends back beyond the bracket 105 to carry a vertical post 110 in fixed position, and a spring 111 interconnects this post, Fig. 15, with the bracket 105 so that the slide 106 is normally biased to a forward position tending to carry the roller 108 between adjacent chain rollers 109 as indicated, and yet permitting the roller 108 to yieldingly be forced rearwardly as each chain roller 109 travels therepast. A second slide 112 is positioned on the top side of the bracket 105 and has its rear end fixed to an upper portion of the post 110 whereby the top slide 112 will be reciprocated in unison with the lower slide 106. A third slide 113 is carried in a guided relation across the top side of the bracket 105 to have an end portion extend rearwardly under a forward portion of the slide 112 in sliding relation therewith and to have an upturned end 114 extend through a slot 115 provided in the slide 112. A compression spring 116 between the rear end of the slot 115 and the upturned end 114 normally urges the third slide 113 to a forward position. The front end of the slide 113 carries a roller 117 on a vertically disposed pin 118 to have the periphery of this roller 117 extend within the cup 44 a sufficient distance to press against the crown that might have been therein causing the spring 116 to be compressed when the roller 108 drops between the chain rollers 109 as previously indicated. When this roller 108 is pushed rearwardly to allow the chain rollers 109 to pass it, the roller 117 is likewise withdrawn from entrance within the cups 44 to permit those cups to travel horizontally therepast without interference or pressure laterally against the roller 117. In case there is no crown within any cup 44, then the roller 117 will enter that particular empty cup 44. The bracket 105 carries a bridge 119 extending across the forward portion of the slide 112 to in turn carry an electrical contact 120 to be in the path of a similar electrical contact 121 carried by the upturned end 114. These contacts 120 and 121 close an electric circuit by abutting one another only when the roller 117 is allowed to enter its full permissible travel within a cup 44 by reason of the absence of a crown therein. Obviously when a crown is therein, the arm 114 will be held back to hold the contacts apart when the arm 112 advances forwardly under the action of the spring 111. Likewise there will be no closing of the circuit when the slide 112 normally pulls the slide 113 rearwardly as one cup 44 advances on beyond the path of the roller 117.

From these contacts 120 and 121 lead conductors 122 and 123, respectively, 122 to one side 124 of the 110 volt line, Fig. 29, and 123 to a winding of the solenoid 125 and thence through the wire 126 to the other wire 127 of the 110 volt supply.

The solenoid 125 is mounted adjacent the block 58 to have an armature 128 reciprocable in substantial parallelism with the slide head 101. The right hand end of the armature 128 has a connecting link 129 pivotally connected therewith by one end and by the other end to a lever 130, Figs. 19–21. This lever 130 is fixed to a barrel 131 that is free to revolve on a horizontally disposed pin 132. Also fixed to this barrel 131 is a second lever 133. The upper end of this lever 133 in turn is pivotally connected to a head 134 slidingly supported along a track 135 fixed alongside the head 101. A portion of the dog 102 overhangs this track 135 to have an end of the head 134 enter thereunder. The top face of the head 134 increases in elevation from the end entering under the dog 102 to the portion to which the lever 133 is attached to form in effect a wedge to enter under the dog 102 upon suitable head travel to lift that dog up out of the path of the actuating lever 91. Normally a torsion spring 136 wrapped about the pin 132 and engaging the arm 130 rocks the lever 133 to hold the head 134 back against the stop 137, in which position the dog 102 is allowed to remain in its normal horizontal position. Then with this construction in mind, when the contacts 120 and 121 come together as above indicated to close the circuit through the solenoid winding 125, the armature 128 is pulled within that winding to kick the head 134 under the dog 102 to lift it and thereby stop reciprocation of the slide bar 73 and in turn stop feeding of the sealing disks to the plate 48. It is pertinent to note that the roller 105 is pushed along the chain 39 in reference to a position of a passageway 55 at the block 58 to receive sealing disks so that the bore 54 when revolved around counter-clockwise to come over that cup 44 not having a crown therein will, therefore, have no sealing disk in it.

In this connection it is also pertinent to point out that by reason of the fact that the diameter of the bore 54 is slightly less than the diameter of the disk to be placed therein, the disk will not drop outwardly from the bore but be held therein by the frictional engagement of the periphery of the disk with the wall of the bore.

Referring to Figs. 1, 4 and 17, the heads 51 of the plungers 49 as they are carried around in their circumferential path of travel, come consecutively under the cam block 138 which is carried by a supporting post 139 extending upwardly in fixed relation from the block 58. As the heads 51 travel under the cam block 138, the plungers 49 are depressed a distance equal at least to the thickness of the sealing disk, whereby the foot 50 is carried down to bring the under face of the sealing disk in close proximity to the plane of the under side of the plate 48. In other words, the travel of the plunger 49 under the influence of the cam block 138 is made to be such that the sealing disk presented in the bore 54 is carried to the lower end of that bore 54 but not ejected therefrom. This travel is determined by shaping the under side of the block 138 to slope from the higher elevation 140 to the lower elevation 141, Fig. 17. The block 138 is so positioned that the downward travel of the plunger 49 occasioned thereby is not had until the sealing disk has been ejected from under the tube 56 and into the bore 54. As the plunger 49 is carried on around past the block 138, the plunger may return to its original top position under the influence of the spring 52.

The crowns deposited in the cups 44 are either provided with a bit of adhesive dropped therein or coated with some disk bonding material. As these crowns are carried along under the plate 48, they come into registry with the lower openings of the bore 54, at least by the time the cups have reached the extreme outer left hand position of travel. At this position and above the plate 48 is mounted a cam block 142 in any suitable manner, herein shown as across the upper ends of the supporting posts 143 and 144 fixed on the table top 30. The under side of the cam block 142 is in the path of the heads 51 of the plunger 49, as is indicated in Fig. 2. As the plate 48 travels from left to right, the head 51 is progressively depressed to cause the foot 50 to eject a sealing disk from the end of the bore 54 then appearing directly over a cup 44 having a crown thereon to cause that disk to drop into the crown, following which the plunger 49 is carried on down to have the foot 50 compressively urge the disk into firm contact with the face of the crown. Then the head 51 is allowed to travel upwardly under the influence of the spring 52 to return the plunger 49 to its extreme upper position, thereby withdrawing the foot 50 from inside of the crown. To effect that action, the cam block 142 has the initial step 145 for ejecting the disk and then has the second step 146 for the setting of the disk in the crown, following which the under surface of the cam block 142 slopes upwardly rapidly to release the plunger 49 without a hammering action. To insure that the plunger 49 does return to its upper position in case, for any reason, the plunger 49 may have a tendency to stick, or the spring 52 become weakened or broken, a finger 147 is mounted on the post 144 to have an edge in the path of the springs 52 and is inclined upwardly so that a compressed spring coming into contact with the finger 147 will be tended to be spread apart and lifted by reason of the wedge action of the finger.

The chain 39 being in continuous motion normally will keep the cups 44 travelling at a uniform speed and hence will bring them out from under the plate 48 to carry them toward the sprocket wheel 36. In between those two sprocket wheels 35 and 36 there is positioned, Fig. 4, an electric heating element 148 to be under the overhanging cups 44. A housing 149 is provided about the forward side at least of the element 148, and therefore, as the cups 44 travel over that element, the cups become heated and likewise the crowns containing the sealing disks are heated so that the adhesive in whatever form it may be, either in a liquid or dried state, between the disk and crown is heated. Thereafter, the heated crown, adhesive and disk are subjected to pressure and testing. However before describing that operation and means for carrying it out, the mechanism is provided for taking care of the emergency wherein the sealing disk carrying tube 56 becomes empty or a lowermost sealing disk is tilted, with the result that there is no feed out to the plate 48 by the slide bar 73.

Normally the sealing disks will drop by gravity against the seat 59 as above indicated. This seat 59 is perforated and by means of the tube 71, a partial vacuum is created in the bore 60 under the seat 59 tending to retain the disk in contact uniformly over the seat 59, but offering little if any resistance to the sliding of the disk horizontally across that seat by the bar 73. The bar 73 as it travels over the seat 59 is sufficiently wide, Fig. 19, to cover all of the perforations and thereby close off the bore 60 by travelling thereacross, the next above disk dropping onto that seat 59 immediately the bar 73 is drawn back out of the way without any appreciable increase in pressure in the bore 60 by reason of its comparatively large volume as compared to the cross section area of the tube 71.

Now if there is no disk seated on the member 59 and the pressure in the bore 60 thereby approaches atmospheric pressure, this condition will be reflected at a valve structure, Fig. 1, controlling a pressureline. This valve mechanism is shown in detail in Fig. 27, wherein the vacuum line 71 communicates with the lower end of a cylinder 150. Discharging from this lower end of the cylinder 150 is a line 151 leading to any vacuum producing source (not shown). A piston 152 is slidingly carried in the cylinder 150 and is normally urged to an upper position by means of a spring 153 between the piston and the lower end of the cylinder 150. As long as there is a substantial degree of vacuum within the lower end of the cylinder 150 below the piston 152, the spring 153 is so designed that the piston 152 will remain at a predetermined position intermediate the top and bottom ends of the cylinder.

From the piston 152 leads a piston rod 154 to enter a valve chamber 155 and connect with a slide valve 156 normally covering the port 157. A pressure line 158 conducts air under pressure into the chamber 155, and as long as the slide valve 156 closes the port 157, there is no escape of that air from the chamber. A tube 159 leads from the discharge port 157 to the head 160, Fig. 28, which is located back of the cups 44 and within the space between the crown feed chute 104 and the crown presence checking roller 117, Fig. 1. Each of the cups 44, Fig. 28, has a passageway 161 leading horizontally from its inner face through the body of the cup to discharge over the cup through the orifice 162. The nozzle 160 has a discharge passageway 163 directed toward the cup passageway 161 whereby those two passageways will come into registry as the cups 44 are carried past the nozzle one after another. Should there be no substantial degree of vacuum in the bore 60 under the sealing disk seat 59 by reason of that seat being uncovered, the spring 153 will push the piston 152 upwardly to carry the slide valve 156 upwardly and thereby uncover the port 157 to cause the air under pressure to flow through the pipe 159, through the nozzle 160, and through the cup passageway 161 as the registry indicated is effected, and this air pressure blowing through that passageway 161 is made to be sufficient to blow a crown off of the cup 44. Of course, if the condition continues (such as when the tube 56 is emptied), all crowns will be blown from the cups 44 as the cups travel past the nozzle 160, whereby no crowns are brought around under the plate 48. Thus this device takes care of the situation where no sealing disks are being fed, and the mechanism has above been described to take the place of the situation where no crowns are being fed and sealing disks are available. The sprocket wheel 36 is the one which drives the chain 39 by means of the shaft 38. In the present form of the invention, this shaft 38 is driven by a worm wheel 164 fixed thereon in constant mesh with the worm 165, Fig. 5, which is fixed on a horizontally disposed shaft 166. On this shaft 166 is fixed a bevel gear 167 in constant mesh with the bevel gear 168 in turn fixed on the driving shaft 169 that is horizontally disposed within a tank 170 under the table 30, this tank preferably carrying oil at a level above the gears just mentioned for lubricating purposes. The shaft 169 extends by its left hand end from the tank 170 and has mounted thereon one or more pulleys 171, herein shown as two, and around these pulleys extend drive belts 172 driven from the main drive motor 173.

The same shaft 169 extends on beyond the shaft 166 to drive another horizontally disposed shaft 174 through the bevel gears 175 and 176. On this shaft 174 is a worm 177 constantly meshing with a worm wheel 178 that is fixed on a vertically disposed shaft 179, which shaft extends on up through the table top 30 to be fixed to a test head plate 180, whereby this head 180 consisting essentially of a circular disk may be revolved in horizontal plane to have its periphery in close proximity to the outer ends of the cups 44 as those cups travel around the right hand side of the sprocket wheel 36. Preferably a bearing 181 is mounted on the top side of the table 30 to support the shaft 179. Mounted on the outside of the bearing 181 is a cam plate 182, Figs. 23 and 24, this plate 182 being initially adjustable about the bearing 181 for suitable adjustment of the locating of the particular parts of the cam surfaces. At least 180 degrees of the plate 182 carries a circular peripheral edge portion 183 which continues around into a cam slot 184 to merge into a cylindrical surface 185 of less radius than that of the surface 183. The opposite vertical face 186 of the slot 184 is formed to complement the surface 185 to maintain a slot of uniform horizontal width.

Mounted under the head plate 180 are a plurality of bell cranks 187, herein shown as twenty-four in number (this may be varied in accordance with the diameter of the plate 180). Each bell crank 187 has a substantially vertically disposed arm 188 on the lower end of which is a foot, herein shown as a roller 189 of a diameter to fit within the slot 184. The bell crank 187 also has a substantially horizontally disposed arm 190 on the outer end and upper side of which is fixed a crown receiving cup 191, Fig. 23. Each of these cups 191 is preferably made with an outer down-turned lip 192 and has the same general configuration as that of the cups 44, wherein there are spaced apart side walls and an arcuate inner wall with a floor over which the crown may slide into the cup and out of the cup as desired. The cup is so proportioned that there is no appreciable lateral movement of the crowns permitted while in the cup.

Since the vertical shaft 179 is driven simultaneously with the vertical shaft 38, these two shafts may be driven in desired time sequence. In this particular instance, the head plate 180 is driven to bring a cup 191 around to register consecutively with each of the cups 44 in such manner that a crown with its disk may be slid out of the cup 44 and directly over it on to the cup 191, the crowns in this manner being transferred from the chain cups 44 to the head cups 191.

To accomplish this transfer automatically, an air pressure line 193 is connected to a valve head 194 which is mounted on a plate 195 free to oscillate about a retaining center screw 196 engaging in the upper end of the shaft 38 in the present design of the mechanism. The line 193 discharges into the chamber 197 having a discharge orifice 198 which may be selectively closed and opened by the needle 199 reciprocatively mounted within the chamber 197 on the end of a valve rod 200 extending from the valve head 194, the valve rod 200 being mounted to slide within the left hand portion of the chamber 197 and sealably close that end, the needle 199 being of less diameter than the internal diameter of the chamber 197. An adjustable head 201 is slidably fitted over a reduced portion 202 of the valve block 194 and is normally urged outwardly by means of a compression spring 203 abutting the block 194 and the inner end of the head 201.

This head 201 fits over the end of the portion 202 by a tubular chamber from which leads a passageway 204, Fig. 23, discharging through its outer face 205. This face 205 is held in compressive engagement by means of the spring 203 with the back or inner ends of the cups 44, whereby the passageway 204 may consecutively register with the cup passageways 161 and thereby permit air under pressure to shoot across the floor of the cup 44 when the needle 199 is withdrawn from the orifice 198 in the position shown in Fig. 23. This discharge of air is timed so that it only flows when the outer end of the cup 44 is in substantial registry with the outer end of the cup 191. This timing mechanism is best illustrated in Figs. 22 and 23. To the left of the sprocket wheel 36 is mounted a rocker arm 206 to pivot about the vertically disposed pin 207 carried by the table top 30. The arm 206 has a nose 208 in the path of the sprockets 209 of the wheel 36. The arm 206 has an upwardly extending head 210 above the nose 208 and a tension spring 211 interengages that head 210 with the valve block 194 normally holding the nose 208 against the sprockets 209 so that the nose 208 will be reciprocated thereby as the nose drops in between and is lifted back out by those sprockets 209 as the wheel 36 travels in its counter-clockwise direction, Fig. 23. A slide 212 is carried on the plate 195 as an integral part of the head 210. The valve rod 200 is rockably connected to the head 210 by means of the screw 213. Thus, as the arm 206 is reciprocated by the sprockets 209, the valve rod 200 is correspondingly reciprocated to cause the needle 199 to close and open the orifice 198 in such timed sequence that the orifice is open when a cup 44 has its passageway 161 registering with the passageway 204. The rockable mounting of the plate 195 about the screw 196 compensates for differences in angularity set up by reason of the slide 212 extending from the head 210.

The cam plate 182 is positioned around the bearing 181 in that position as indicated in Fig. 24, wherein the slot 184 causes the arms 188 of the bell cranks 187 to swing to the right a sufficient distance to rock the arm 190 in each instance down to have the outer portion at least of the floor of the cup 191 at the elevation of or slightly below that of the cup 44. By reason of the increased radius of the curvature of the edge 183 which continues around from each end of the slot 184, the rollers 189 will be progressively pushed outwardly from the center of the shaft 179 and thereby cause the arms 190 to rock upwardly to carry the cups 191 toward the under side of the head plate 180.

Directly centered over each of the cups 191 is a pressure head 214, Fig. 26, projecting from the under side of the plate 180. This head 214 has a shape and diameter which will permit the crown and its contained disk to fit up and over without the edge of the crown abutting the under side of the plate 180. The contour of the head 214 is substantially that of the inner side of the inverted crown so that when the cup 191 brings the crown up, continued travel of the cup 191 will cause the crown to press the disk against that head 214 and thereby compress the disk against the inner face of the crown and firmly set it against the intervening softened adhesive. This pressure is maintained by reason of the shape of the surface 183 while the disk 180 travels in the design herein shown substantially at 180 degrees or even more. During this travel, the adhesive may cool and set.

This head 214 is perforated to have passageways 215 extending from its under side into a central chamber 216. The head extends by a portion on through the plate 180 to screw threadedly engage thereabove a cylindrical cap 217 within which is slidingly fitted at least by its lower end, a plunger 218. This plunger 218 is purposely made to be of considerable weight whereby it will normally drop by gravity against the upper end of the head 214 to close off the upper end of the chamber 216 which is otherwise normally open. The length of the cylinder 217 is made to be such that an upper portion, herein shown as a reduced neck 219, protrudes from the upper end of the cylinder 217 with a free sliding fit. A passageway 220 leads horizontally from the chamber 216 and on out through the plate 180 to open through the vertical face of the periphery of that plate 180, there thus being one opening in that face for each of the heads 214 carried by the plate 180.

This plate 180 in the present showing travels in a clockwise direction. Around the peripheral edge of the plate 180 is mounted a shoe 221 to be in sliding contact therewith. The shoe 221 extends around about 180 degrees of the plate 180, the initial portion of which is about 135 degrees in a clockwise direction around from the point of transfer or registry of cups 44 with cups 191. These proportions in terms of degrees are only approximate and are not critical and may be varied, particularly when different types of adhesives are employed.

In any event, the shoe 221 is provided with an inner chamber 222 open on that side toward the plate 180, the peripheral edge of the plate 180 serving to close off that chamber. An air pressure line 223 carries air under pressure into the chamber 222 and constantly maintains a pressure therein. As each of the openings of the passageways 220 appear under the shoe 221, the air pressure is transferred through the passageway 220 into the chamber 216 then through the passageways 215 against the sealing disk pressed thereagainst by the crown resting upon the cup 191 thereunder. When this pressure is created, the plunger 218 will be forced upwardly to extend the neck 219 from the cylinder 217 as far as will be permitted by the shoulder 224, Fig. 26. A visible indication is thereby given that there is a pressure created against the sealing disk when the neck 219 is extended from the cylinder 217. In the event there is a defective disk in the crown or there is no disk on the crown, or there is no crown at all, then the pressure will be dissipated from the chamber 216 to that extent whereby the plunger 218 is not lifted, and that condition will be indicated by the fact that the neck 219 is not elevated above the upper end of the cylinder 217.

The terminal end of the shoe 221 is at that position where the arms 190 start to drop away from the plate 180 to lower the cups 191 so that the chambers 216 are no longer subjected to pressure. As these arms 190 drop, the cup 191 being slightly inclined to have the lip 192 at the lowermost point, the crowns will have a tendency to slide thereover under the influence of gravity, but to insure that the crown does actually leave the cup 191, an air nozzle 225 is held in fixed position to extend between the under side of the head 214 and the lower cup 191, Fig. 26, and compressed air is supplied through a feed pipe 226 to flow through the nozzle 225 and out an under an outwardly directed port 227 on to the face of the cup 191 to blow the crown off the cup and allow it to drop into a receiving chute 228 which is supplied immediately under and to one side of the lip 192.

In order to prevent wastage of air through the nozzle 225, an intermediate application of air thereto may be had in timed sequence by connecting the supply pipe 226 to any suitable timing device. In the present design, the supply pipe 226 is connected to the head 201 so that whenever pressure is created therein by the withdrawal of the needle 199 from the orifice 198, air will be allowed to flow through the pipe 226 and through the nozzle 225, the timing being thus properly had for the discharge action.

In the path of the necks 219 when upwardly positioned by pressure in the chamber 216, is a shoe 229 swingable about a horizontal axis provided by the pin 230, the shoe 229 dropping by gravity and extending in the direction away from the pin 230 in accordance with the direction of travel of the plate 180. If there be no pressure within the chamber 216, the neck 219 as above explained will remain in its normal lowered position, and there will be no lifting of the shoe 229. On the other hand, as each of the necks 219 when in the upper position pass under the shoe 229, those elevated necks will raise and hold raised the shoe 229.

Pressing against the upper side of the shoe 229 is a switch actuating arm 231, the down position of which corresponds to the off or open position of the switch 232, Fig. 29. When the shoe 229 is lifted as previously indicated, the switch arm 231 is likewise lifted and the switch 232 closed. When this switch 232 is closed, a circuit is completed through the wire 233 leading from a source of current (herein shown as a 220 volt source), a wire 234, a solenoid winding 235, and a wire 236 therefrom back to the source of current. When the switch 232 is closed, the solenoid winding 235 is energized.

This solenoid 235 controls not only a counting mechanism but also the disposition of usable crowns and rejected crowns, causing the separation of one class from the other. When the solenoid is not energized, the counting of the crowns proceeds and all crowns produced during that de-energization are classified as good crowns. Upon energization, the counting of the crowns stops and the rejected crowns then possibly being produced are diverted away from the good crowns to eventually pass into a receptacle provided for that purpose.

On the back end portion of the shaft 174, Figs. 5, 6 and 11, is positioned an eccentric or cam 237. Straddling this cam 237 from above is a fork 238 on the lower end of a lever 239 which is pivoted inside of the tank 170 on a horizontally disposed shaft 240, this shaft 240 extending rearwardly through the rear wall of the tank 170. On the outer end of the shaft 240 is fixed an upwardly extending lever 241 to have an upper end portion extending above the table top 30 and carry a rearwardly extending pin 242, horizontally disposed.

This pin 242 extends across and within a slot 243 provided across the upper side of a cross head 244 which is slidingly guided longitudinally of the top 30 by the plate 245. A latch pin 246 extends in a sliding manner through the cross head 244 and a distance thereabove to terminate in an upper head 247 below which is a compression spring 248 surrounding the pin 246 and bearing by its lower end against the top side of the cross head 244. A lever 249 rockable about a horizontally disposed pin 250 carried by the upper end of a post 251 extending upwardly from the table top 30 is carried across from the pin 250 and normally rests by gravity against the head 247. The lever 249 is carried on beyond the head 246 and has a weight 252 fixed to that end of the lever, in the present instance hanging downwardly therefrom. A release finger 253 is fixed to the horizontally disposed shaft 254 to extend normally horizontally across and under the weight 252. By means of a spring 255 connected to the finger 253 and in turn connected to the armature 256 of the solenoid 235, the armature 256 being mounted to be reciprocated vertically, and to drop by gravity to a lowermost position as indicated in Fig. 9, the finger 253 will be lifted. Thus when the armature 256 is lifted by energizing the solenoid 235, the finger 253 will lift the lever 249 to allow the spring 248 to lift the latch rod 246.

Under an undercut portion of the cross head 244 slidingly extends a plate 257 to have an aperture in its upper face to register with the lower end of the pin 246, whereby the latch pin 246 may interlock the slide 257 with the cross head 244 and be reciprocated in unison therewith upon the rocking of the lever 241 as induced by the cam 237. The slide 257 carries a pawl 258 swingable about a vertical axis and normally urged by a torsion spring 259 against the periphery of a ratchet wheel 260 that is mounted on a vertical shaft 261. The ratchet wheel 260 is provided with teeth 262 with which the tongue 263 of the pawl 258 may engage when the slide 257 is pulled to the right, Fig. 10. Reverse travel of the pawl 258 causes the tongue 263 to slide over a tooth into the next interdental space. A dog 264 is pressed against the periphery of the wheel 260 by a spring 265 to prevent reverse travel of the wheel 260.

The shaft 261 carries a worm 266 above the wheel 260 to be in constant mesh with the worm wheel 267 that is fixed on the transverse shaft 268. This shaft 268 extends rearwardly through a mounting bracket 269 to carry an indicating pointer 270 on its rear end that travels around over a card 271 which is mounted within the housing 272 preferably covered by a transparent material 273. The characters arranged around the card 271 may indicate in terms of units of 100, 144, or 1,000 as may be desired. The speed of the shaft 174 which reciprocates the lever 241 by means of the cam 237 is made to be such in conjunction with the number of teeth 262 on the wheel 260 that the pointer 270 will be driven in timed sequence with the travel of the head plate 180 so that a true indication on the card 271 will be had of the number of asesmbled crowns and disks that are dropped from the head into the chute 228. To permit resetting of the pointer 270 around the card 271, the upper end of the shaft 261 is provided with a hand wheel 274, by means of which hand wheel 274 the shaft 261 may be turned counter-clockwise to move the hand 270 around to the desired setting.

On the opposite or forward end of the shaft 268 is mounted an arm 275 that swings in the path of a lever 276 supported intermediate its ends by a pin 277 carried in a supporting bracket 278, Fig. 7. The arm 275 lifts the end of the lever 276 thereover and allows it to drop again once each revolution of the shaft 268.

The other end of this lever 276 is pivotally connected through the screw 279 to a valve stem 280. This valve stem 280 extends downwardly from the screw 279 slidingly through a fixed bracket 281 mounted on the support 276, and on down to an air pressure control valve 282. The stem 280 is normally held in an upper position wherein the valve 282 is closed by means of a compression spring 283 bearing between a pin 284 on the valve stem and the top of the valve 282. A tube 285 supplies air under pressure from any suitable source (not shown) to the valve 282. From the valve 282 a pressure line 286 leads to the top end of a cylinder 287 within which is mounted a piston 288 having a piston rod 289 connected thereto and extending on down through the lower end of the cylinder 287 to have a rack bar 290 on its lower end. Normally a spring 291 fixed to the rack bar by one end and to the cylinder 287 by the other end, Fig. 6, holds the piston 288 and the rack bar 290 accordingly in their uppermost positions. When the valve 282 is opened, the piston 288 is driven downwardly. A pinion gear 292 carried on a gate control shaft 293 is in constant mesh with the rack bar 290. On the other end of the shaft 293 is a gate 294 formed to close across the end of the chute 228 when the piston 288 is driven downwardly in the cylinder 287. The valve 282 is of that type commercially obtainable which, when closed, permits a bleeding action back from the pipe 286 so that the spring 291 may push the piston 288 back upwardly in the cylinder 287. In this travel under the influence of the spring 291, the gate 294 is rocked around to the lowermost position, as indicated in Figs. 4 and 6. As long as pressure is maintained on the cylinder 287, the gate 294 remains closed.

Therefore, through the timing arrangement secured by the arm 275 revolving in unison with the shaft 268 which drives the indicator, the gate 294 will be opened to allow the number of assembled crowns to slide out of the chute 228 as indicated by the pointer 270. Thus the gate 294 will be closed once each complete revolution of the shaft 268, but will remain open throughout the greater degree of the travel of the shaft 268, as will be further explained below. This chute 228 as indicated slopes forwardly from under the lips 192 of the cups 191, Fig. 26, and then thence along the outside of the table 30 to slope downwardly and to the right to a lower end across which the gate 294 is hinged.

Referring again to the shaft 254 to which the finger 253 is fixed, this shaft 254 extends transversely across and above the table 30 to the forward side thereof where an upturned lever 295 is fixed thereto, Figs. 1 and 4. Rockably connected to the upper end of the lever 295 is a shift rod 296 which extends across to pivotally connect with the reject gate 297. This gate 297 normally forms the left hand side wall in part of the forwardly and downwardly inclined portion of the chute 228.

This door 297 is hinged at its forward side on the pin 298, whereby the door 297 may by its inner end swing over to the right hand wall 299 of the chute 228 and thus close off the lower portion of the chute from the upper portion. When the gate 297 is swung to the wall 299, a reject chute 300 is opened and all of the crowns dropping from the cups 191 into the upper portion of the chute 228 and sliding theredown will strike the door 297 and the crowns will thus be deflected to fall down the chute 300. This door 297 is swung by the rod 296 which is operated by the travel of the finger 253. Therefore, it is to be seen that the operation of the solenoid 235 not only serves to disconnect the counting mechanism from the driving mechanism when "reject" crowns are being produced, but also these reject crowns are deflected from the passageway for "good" crowns, all as controlled by the positions, as above indicated, of the necks 219 of the test head.

As indicated in Figs. 3 and 4, a bracket 301 is fixed to the rod 296 to extend upwardly and engage a switch operating arm 302. This arm 302 is pivoted on the pin 303 and carries a contact member 304 thereabove to be swung to either of the positions from which the two conductors 305 and 306 lead, Fig. 29. The arm 302 itself is connected to the conductor 307 so that a circuit is completed in either extreme position of the arm 302. Incidentally, a spring 308 connected to the arm 295 normally holds the rod 296 in the extreme left hand position of travel, which position is that when the door 297 closes off the reject chute 300 as indicated in Fig. 1. In this position, the arm 302 closes the circuit through the conductor 305 whereby a green lamp 309 is illuminated to indicate that the machine is operating satisfactorily and that "good" crowns are dropping into the chute 228 to slide down against the normally closed gate 294 at the extreme lower end to accumulate thereabove within the chute until the gate is opened as above indicated. On the other hand, should the machine be dropping "reject" crowns down the chute 300, the rod 296 is then in its right hand position and the arm 302 completes the circuit through the wire 306 to energize the red lamp 310 giving the visual indication of "trouble."

Transversely across and under the discharge end of the chute 228 is provided a conveyor 311 driven by a motor 312. On this conveyor 311 may be placed crown receiving cartons 313 to be carried under the gate 294 and when filled, on out of the way to permit an empty carton to replace the filled carton in that position. A vibrating motor 314, indicated in Fig. 29, drives any well known mechanism (not shown) to vibrate the carton being filled. Both of these motors 312 and 314 are intermittently driven preferably. To provide the intermittent drive, a switching mechanism is mounted to be operated through the operation of the shaft 268, Fig. 7.

On the forward side of the arm 275 is mounted a contact member 315, and on a block 316 of insulating material appear a number of contacts, herein shown as seven in number, and indicated by the numerals, in clockwise direction, 317, 318, 319, 320, 321, 322 and 323, one arranged consecutively after the other in spaced apart relation and centered on a common radius, to be in the path of the contact member 315 as it travels thereover, whereby a circuit may be closed between the contact member 315 and each of the other enumerated numbered contacts on the block 316 during the interval of the passage of the member 315 therearound. This block 316 is held stationary.

As indicated in Fig. 29, the arm 275 is interconnected with the wire 127 which leads from the 110 volt source of current above indicated. The contact members 317 and 321 inclusive are electrically interconnected, and a common lead 324 is carried therefrom to the vibrator motor 314, to one terminal thereof (this being a single phase motor in the present design). From the other terminal of the motor 312 is carried a wire 325 back to the wire 122 which in turn connects with the 110 volt source of current. The contact member 323, through the wire 326, connects with one terminal of the motor 312 (a single phase motor in the present showing), the other terminal of which motor is connected to the wire 327 to the wire 325. The contact member 322 is normally connected to a recording device for printing the operator's production from the machine, but this connection of the recording device is not herein shown for the reason that it is not a part of the present invention per se.

Referring to Figs. 7 and 29, the arm 275 (preferably insulated from the shaft 268 and the lever 276) is in the position wherein no electrical circuits are closed by it. Assuming a carton 328 to be on the conveyor 311 and under the gate 294, and the machine operating normally, the assembled crowns after being tested as above indicated, drop down the chute 228 and slide over the gate 294 into the carton 328. After a predetermined number of the crowns drop into the box 328 as reflected in the travel from contact 317 to 320 of the contact member 315, a circuit is closed between the arm 275 to operate the vibrator motor 314 to vibrate the carton 328 to settle down the crowns therein. After the arm 275 leaves the contact member 317, the circuit is opened, and the motor 314 comes to a stop. Crowns continue to drop into the carton 328, and the arm 275 again closes the circuit through the vibrator motor 312 when its contact member 315 touches the contact member 318 to vibrate the carton accordingly for a time interval. This vibrating action is repeated as the arm 275 travels across the following contact members 319, 320 and 321. All of this time the carton 328 remains stationary in respect to travel of the conveyor 311. When the arm reaches the contact member 323, the circuit is closed through the motor 312 to set the conveyor 311 into movement. Substantially simultaneously with this beginning of travel of the conveyor 311, the gate 294 is closed as above described, and crowns are allowed to accumulate in the chute 228 for the time being. The circumferential length of the contact 323 is made to be such that by the time the contact 315 of the arm 275 leaves the contact 323, the filled carton 328 will have been carried on beyond the filling position and an empty carton brought into that position, whereupon the circuit is broken, and the motor 312 stops, the gate 294 dropping down to allow the accumulated crowns to discharge into the carton and subsequent crowns to slide down the chute 228 freely.

The main drive motor 173, herein indicated as a three phase, 220 volt motor, has one wire 329 leading threfrom through the wire 236 to the main 220 volt switch 330. The other two wires 331 and 332 lead from the motor to a pressure operated switch 333 from which the wires 332 and 331 are respectively interconnected with the switch 330. Interposed in these wires 331 and 332 and located on the main control board 336 are push button switches 337 and 338. The pressure control switch 333 operates in the customary manner in conjunction with the air pressure line 339 which supplies the pressure to the valve lines 158, 193, the line 223, and the valve 282 from the pressure source 340, in such manner that whenever the pressure in the supply line 339 is below the required operating pressure, the switch 333 is open whereby the entire mechanism may not operate until the proper pressure is supplied.

While the invention has been described in detail in reference to the particular design shown in the accompanying drawings, it is obvious that many structural changes may be employed without departing from the spirit of the invention, such as in the specific counting mechanism, the particular mounting and shapes of the control levers and switches, and details of the specific means for accomplishing the functions of the individual members. Also, the wiring diagram may be varied, and a common voltage employed. Therefore, I do not desire to be limited to that precise form beyond the limitations as may be imposed by the following claims.

I claim:

1. Means for testing crown caps comprising a crown carrying cup; a pressure head shaped to fit against a disk in a crown carried by the cup; means for relatively bringing said crown toward the head to compressibly engage the disk therebetween; said head having an air chamber and a passageway leading thereto from the surface of the head contacting the disk; a plunger carried by the head to be shifted by predetermined pressure in said chamber; means for applying pressure to said chamber subject to sealing of said passageway by said disk; means shiftable for selective direction of unusable crown and disk assemblies from usable assemblies; and means actuated by said plunger shifting for actuating said shiftable means.

2. Means for testing crowns comprising a pressure head having a shape and contour to fit within the crown flange and conforming to the shape of the crown area within the flange; means compressibly engaging a disk between the head and said area within the flange of a crown; said head having a passageway to be closed over by said disk; means for applying air under pressure to said passageway; a member shiftable upon pressure being retained in said passage when sealed off by said disk; separate means for receiving crown assemblies sealing and not sealing said passageway; means for selectively directing crown assemblies to said separate means; and means actuated upon travel of said shiftable member operating said directing means.

3. Means for testing crowns comprising a pressure head having a shape and contour to fit within the crown flange and conforming to the shape of the crown area within the flange; means compressibly engaging a disk between the head and said area within the flange of a crown; said head having a passageway to be closed over by said disk; means for applying air under pressure to said passageway; a member shiftable upon pressure being retained in said passage when sealed off by said disk; separate means for receiving crown assemblies sealing and not sealing said passageway; means for selectively directing crown assemblies to said separate means; and means actuated upon travel of said shiftable member operating said directing means; and means for removing said assemblies from said head.

4. Means for testing crowns comprising, the combination of a revoluble member, a plurality of pressure heads spaced around said member, each having a discharge passage leading therefrom and each head being shaped to enter a crown within its flange and match the shape of the area of the crown within its flange; a crown assembly cup mounted adjacent each of said heads; means for placing crown and disk assemblies in said cups with the disk sides toward said heads; means for relatively moving said cups toward said heads to cause said crowns to hold said disks compressibly therebetween over said passageways; means for applying a fluid under pressure to said passageways; means shiftable at each of said heads responsive to predetermined pressure built up in said passageways; said cup relative moving means spacing said cups from said heads following said gas application to permit movement of the crown assemblies from said cups; means receiving the crown assemblies from the cups; means withholding imperfect crowns from said receiving means; and means responsive to said shiftable means for actuating said withholding means.

5. Means for testing crowns comprising, the combination of a revoluble member, a plurality of pressure heads spaced around said member, each having a discharge passage leading therefrom and each head being shaped to enter a crown within its flange and match the shape of the area of the crown within its flange; a crown assembly cup mounted adjacent each of said heads; means for placing crown and disk assemblies in said cups with the disk sides toward said heads; means for relatively moving said cups toward said heads to cause said crowns to hold said disks compressibly therebetween over said passageways; means for applying a fluid under pressure to said passageways; means shiftable at each of said heads responsive to predetermined pressure built up in said passageways; said cup relative moving means spacing said cups from said heads following said gas application to permit movement of the crown assemblies from said cups; means receiving the crown assemblies from the cups; means withholding imperfect crowns from said receiving means; and means responsive to said shiftable means for actuating said withholding means; a rockable arm carrying each of said cups; and said cup moving means comprising a cam selectively rocking said arm through predetermined lengths of revolution of said revoluble member.

6. Means for testing crowns comprising, the combination of a revoluble member, a plurality of pressure heads spaced around said member, each having a discharge passage leading therefrom and each head being shaped to enter a crown within its flange and match the shape of the area of the crown within its flange; a crown assembly cup mounted adjacent each of said heads; means for placing crown and disk assemblies in said cups with the disk sides toward said heads; means for relatively moving said cups toward said heads to cause said crowns to hold said disks compressibly therebetween over said passageways; means for applying a fluid under pressure to said passageways; means shiftable at each of said heads responsive to predetermined pressure built up in said passageways; said cup relative moving means spacing said cups from said heads following said gas application to permit movement of the crown assemblies from said cups; means receiving the crown assemblies from the cups; means withholding imperfect crowns from said receiving means; and means responsive to said shiftable means for actuating said withholding means; said heads each having a pressure chamber in communication with said head passageways; and said shiftable means comprising a plunger carried by the head to have an end portion closing off said chamber.

7. Means for testing crowns comprising, the combination of a revoluble member, a plurality of pressure heads spaced around said member, each having a discharge passage leading therefrom and each head being shaped to enter a crown within its flange and match the shape of the area of the crown within its flange; a crown assembly cup mounted adjacent each of said heads; means for placing crown and disk assemblies in said cups with the disk sides toward said heads; means for relatively moving said cups toward said heads to cause said crowns to hold said disks compressibly therebetween over said passageways; means for applying a fluid under pressure to said passageways; means shiftable at each of said heads responsive to predetermined pressure built up in said passageways; said cup relative moving means spacing said cups from said heads following said gas application to permit movement of the crown assemblies from said cups; means receiving the crown assemblies from the cups; means withholding imperfect crowns from said receiving means; and means responsive to said shiftable means for actuating said withholding means; said responsive means comprising an electrical circuit including a source of current, a switch to close the circuit, and a solenoid magnet winding, said switch being operated by travel of said shiftable member.

8. Means for testing crowns comprising, the combination of a member revoluble about a vertical axis; a plurality of test heads arranged around the member; air chambers extending above said heads; said heads having passageways opening into said chambers and said heads each extending from said member by a portion shaped to enter one of said crowns to bear therein equally over the crown area within its flange; a plunger freely slidingly entering each of said chambers; a lever rockably carried by said member under each head; a crown carrying cup on each lever; cam means for raising and lowering said lever during selected portions of revolution of said member; said member having a passageway leading from each of said heads to and opening in a peripheral portion thereof; an air supply head engaging a limited length of said peripheral portion whereby air pressure in said supply head may be communicated to those peripheral leading passageways opening within said air head; said cam means being arranged to lift and hold said levers in their upper positions during travel of the heads thereabove past said air supply head to have crowns carried on the cups of said levers compressibly holding the disks on their crowns against said test heads; a rockable arm in the path of said plungers; means receiving crowns from said cups when said levers rock downwardly; and means actuating through rocking of said arm for withholding reject crowns from said receiving means.

9. In a machine for testing disks in crowns, the combination of a member revoluble about a vertical axis; a plurality of test heads arranged around the member; air chambers extending above said heads; said heads having passageways opening into said chambers and said heads each extending from said member by a portion shaped to enter one of said crowns to bear therein equally over the crown area within its flange; a plunger freely slidingly entering each of said chambers; a lever rockably carried by said member under each head; a crown carrying cup on each lever; cam means for raising and lowering said lever during selected portions of revolution of said member; said member having a passageway leading from each of said heads to and opening in a peripheral portion thereof; an air supply head engaging a limited length of said peripheral portion whereby air pressure in said supply head may be communicated to those peripheral leading passageways opening within said air head; said cam means being arranged to lift and hold said levers in their upper positions during travel of the heads thereabove past said air supply head to have crowns carried on the cups of said levers compressibly holding the disks on their crowns against said test heads; a rockable arm in the path of said plungers; means receiving crowns from said cups when said levers rock downwardly; and means actuated through rocking of said arm for withholding reject crowns from said receiving means; crown assembly counting means driven in synchronization with said member; and means interrupting the operation of said counting means controlled by travel of said arm.

10. For a bottle crown and disk testing machine, means for pressurizing the disk in the crown and testing the assembly for sealability comprising a circular rotatable head plate mounted on a vertically disposed axis; a plurality of pressure heads spaced circumferentially around said plate adjacent its periphery, each of these heads having a nose extending from the underside of said plate and shaped to fit within an inverted crown, coextensive in area to the area of the crown within its upturned flange, and further shaped to conform to the shape of that area; said pressure heads each having a fluid chamber and a passageway leading from that chamber through said nose to open from the underside thereof; said plate having a separate passageway leading from each of said chambers and ported in the periphery of the plate; a plurality of levers equal in number to that of said heads, rockably carried by said plate; each of said levers having an arm extending toward a pressure head; a crown carrying cup on said arm aligned to be movable toward and away from said nose in vertical travel relation; a cam member fixed relative to travel of said plate and interengage with all of said levers in a manner to rock said arms by their cup ends toward said pressure heads and there hold them during a portion of each revolution of the plate and to lower said arms during the remainder of that revolution; means for feeding one of said crown and disk assemblies in its inverted position onto each of said cups one after another while in their lowered positions; said arms being formed to compressibly squeeze said disk between its crown and the nose of said pressure head when the arms are held theretoward; a fluid pressure supply head around which said plate ported periphery travels to receive a fluid flow from that supply head into each of said ports covered by the head; said supply head being spaced a circumferential length around the plate from the position of said crown feeding whereby arm exerted pressure alone on said disk held by its crown will be maintained for a period of time prior to fluid pressure from said supply head; means indicating pressure in said chambers; and means for removing the crowns from their cups after said pressure heads leave communication with said supply head.

11. For a bottle crown and disk testing machine, means for pressurizing the disk in the crown and testing the assembly for sealability comprising a circular rotatable head plate mounted on a vertically disposed axis; a plurality of pressure heads spaced circumferentially around said plate adjacent its periphery, each of these heads having a nose extending from the underside of said plate and shaped to fit within an inverted crown, coextensive in area to the area of the crown within its upturned flange, and further shaped to conform to the shape of that area; said pressure heads each having a fluid chamber and a passageway leading from that chamber through said nose to open from the underside thereof; said plate having a separate passageway leading from each of said chambers and ported in the periphery of the plate; a plurality of levers equal in number to that of said heads, rockably carried by said plate; each of said levers having an arm extending toward a pressure head; a crown carrying cup on said arm aligned to be movable toward and away from said nose in vertical travel relation; a cam member fixed relative to travel of said plate and interengage with all of said levers in a manner to rock said arms by their cup ends toward said pressure heads and there hold them during a portion of each revolution of the plate and to lower said arms during the remainder of that revolution; means for feeding one of said crown and disk assemblies in its inverted position onto each of said cups one after another while in their lowered positions; said arms being formed to compressibly squeeze said disk between its crown and the nose of said pressure head when the arms are held theretoward; a fluid pressure supply head around which said plate ported periphery travels to receive a fluid flow from that supply head into each of said ports covered by the head; said supply head being spaced a circumferential length around the plate from the position of said crown feeding whereby arm exerted pressure alone on said disk held by its crown will be maintained for a period of time prior to fluid pressure from said supply head; means indicating pressure in said chambers; and means for removing the crowns from their cups after said pressure heads leave communication with said supply head; means for directing non-sealable crown and disk assemblies from sealable assemblies; and means actuated by said indicating means by reason of non-pressure in said chambers to operate said receiving means.

ROBERT P. SMITH.

REFERENCES CITED

The following references are of record in the file of this patent:

UNITED STATES PATENTS

| Number | Name | Date |
|---|---|---|
| 415,201 | Hipperling | Nov. 19, 1889 |
| 1,063,324 | Bond | June 3, 1913 |
| 1,134,031 | Clark | Mar. 30, 1915 |
| 1,359,799 | Gerhardt | Nov. 23, 1920 |
| 1,628,338 | Skov | May 10, 1927 |
| 1,850,208 | Jones | Mar. 22, 1932 |
| 1,931,294 | Nagy | Oct. 17, 1933 |
| 2,268,124 | Maybarduk | Dec. 30, 1941 |